United States Patent [19]
Branton, Jr. et al.

[11] Patent Number: 6,061,332
[45] Date of Patent: *May 9, 2000

[54] SYSTEM AND METHOD FOR THE AUTOMATED CONFIGURATION OF NETWORK ELEMENTS IN A TELECOMMUNICATIONS NETWORK

[75] Inventors: Robert A. Branton, Jr., Farmers Branch; John Mark DeMoss, The Colony; Donald Pitchforth, Rockwall, all of Tex.

[73] Assignee: MCI Communications Corporation, Washington, D.C.

[*] Notice: This patent is subject to a terminal disclaimer.

[21] Appl. No.: 08/778,732

[22] Filed: Dec. 31, 1996

Related U.S. Application Data

[63] Continuation-in-part of application No. 08/671,029, Jun. 25, 1996, Pat. No. 5,845,062.
[51] Int. Cl.[7] .......................... G01R 31/08; H04L 12/28; G06F 15/173; G06F 15/177
[52] U.S. Cl. .......................... 370/241; 370/410; 709/224; 709/221
[58] Field of Search .................... 370/254, 351, 370/355, 360, 337, 398, 241, 242, 244, 410, 522; 709/224, 221

[56] References Cited

U.S. PATENT DOCUMENTS

| | | | |
|---|---|---|---|
| 5,226,120 | 7/1993 | Brown et al. | 395/200 |
| 5,285,494 | 2/1994 | Sprecher et al. | 379/59 |
| 5,309,509 | 5/1994 | Cocklin et al. | 379/165 |
| 5,513,171 | 4/1996 | Ludwiczak et al. | 370/13 |
| 5,845,062 | 12/1998 | Branton et al. | 395/200.54 |
| 5,870,558 | 2/1999 | Branton et al. | 395/200.54 |

*Primary Examiner*—Michael Horabik
*Assistant Examiner*—Kevin C. Harper

[57] ABSTRACT

A system and method for configuring network elements. A routing network enables one or more controllers to connect to any network element within a service provider's network via craft interface ports. The controllers are controlled by the service provider and configure network elements according to data in a service provider database.

17 Claims, 6 Drawing Sheets

SYSTEM AND METHOD FOR THE AUTOMATED CONFIGURATION OF NETWORK ELEMENTS IN A TELECOMMUNICATIONS NETWORK

RELATIONSHIP TO OTHER APPLICATIONS

This application is a Continuation-in-part of U.S. Patent Application entitled "System and Method for Tracking and Monitoring Network Elements", Ser. No. 08/671,029, filed Jun. 25, 1996, U.S. Pat. No. 5,845,062, now issued Attorney Docket No. RIC-96-041 (1575.1630000), which is incorporated herein by reference in its entirety.

CROSS-REFERENCE TO OTHER APPLICATIONS

The following applications of common assignee contain some common disclosure as the present application:

U.S. patent application entitled "System and Method for Identifying the Technique Used for Far-End Performance Monitoring of a DS1 at a Customer Service Unit", Ser. No. 08/671,028, filed Jun. 25, 1996, Attorney Docket No. RIC-96-021 (1575.1150000).

U.S. patent application entitled "System and Method for Formatting Performance Data In a Telecommunications System", Ser. No. 08/670,905, filed Jun. 26, 1996, Attorney Docket No. RIC-96-030 (1575.1470000).

U.S. patent application entitled "System and Method for Reported Root Cause Analysis", Ser. No. 08/670,844, filed Jun. 28, 1996, Attorney Docket No. RIC96-031 (1575.1650000).

U.S. patent application entitled "System and Method for Unreported Root Cause Analysis", Ser. No. 08/668,516, filed Jun. 28, 1996, Attorney Docket No. RIC96-032 (1575.1670000).

U.S. patent application entitled "Enhanced Correlated Problem Alert Signals", Ser. No. 08/670,848, filed Jun. 28, 1996, Attorney Docket No. RIC-96-033 (1575.1590000).

U.S. patent application entitled "Correlated Problem Alert Signals", Ser. No. 08/673,271, filed Jun. 28, 1996, Attorney Docket No. RIC-96-034 (1575.1610000).

U.S. patent application entitled "Raw Performance Monitor Correlated Problem Alert Signals", Ser. No. 08/670,847, filed Jun. 28, 1996, Attorney Docket No. RIC-96-035 (1575.1600000).

U.S. patent application entitled "System and Method for Reported Trouble Isolation", Ser. No. 08/672,812, filed Jun. 28, 1996, Attorney Docket No. RIC96-036 (1575.1660000).

U.S. patent application entitled "System and Method for Unreported Trouble Isolation", Ser. No. 08/672,513, filed Jun. 28, 1996, Attorney Docket No. RIC96-037 (1575.1640000).

U.S. patent application entitled "Monitor Point Identification", Ser. No. 08/672,512, filed Jun. 28, 1996, Attorney Docket No. RIC-96-038 (1575.1540000).

U.S. patent application entitled "Service Management Layer Threshold Setting", Ser. No. 08/670,845, filed Jun. 28, 1996, Attorney Docket No. RIC-96-039 (1575.1530000).

U.S. patent application entitled "Monitor Point Activation", Ser. No. 08/672,356, filed Jun. 28, 1996, Attorney Docket No. RIC-96-040 (1575.1520000).

U.S. patent application entitled "Intranet Graphical User Interface For SONET Network Management", U.S. Pat. No. 5,870,558 Dec. 31, 1996 filed, Attorney Docket No. RIC96-041AA (1575.1630001).

The above-listed applications are incorporated herein by reference in their entireties.

BACKGROUND OF THE INVENTION

1. Field of the Invention

The present invention relates generally to telecommunication network management, and more specifically is directed toward a system and method for monitoring and configuring network elements for a service provider.

2. Related Art

There is an ongoing need to improve network monitoring and management techniques at all levels, from the network element level up through the highest system level. Network elements are monitored to provide a detailed predefined set of network element performance data. Examples of performance data and alarm information that can be retrieved from a network element include the number of errored seconds, severely errored seconds, path alarm indication signals, etc.

FIG. 1 illustrates an example of a conventional vendor-controlled network management system 100 that retrieves network performance data from, and configures a group of network elements 110. In this network management system, the operations controller (OPC) 130 is connected to the network elements 101 and 104 via Control Network (CNet) connections 122 and 124, respectively. The network elements 101–104 are referred collectively as the OPC group 110. The network elements 101–104 are interconnected by links 111–113. Links 111–113 represent either intrasite or intersite connections. Intrasite connections can be provided by CNet bridge cables, while intersite connections can be provided via the synchronous optical network (SONET) defined data communications channel (DCC) overhead bytes.

For the network monitoring operation, the OPC 130 periodically interrogates the computer resident within each network element 101–104. The network elements 101–104 provide the OPC 130 with performance and status information. The OPC 130 then provides the collected information to the network manager 140. The network manager 140 retrieves performance and status information from a plurality of network element groups via a plurality of OPCs, including the OPC 130 shown in FIG. 1.

In a similar fashion, the network manager 140 is also used to configure the network elements 101–104. Examples of types of configuration settings that can be accomplished in this fashion include switching the performance alarms to an 'on' or 'off' state, and setting the threshold parameters used to activate the performance alarms. From the network manager 140 a command is provided to the OPC 130 that is used to configure one or more of the network elements 101–104 within the OPC group 110.

In this conventional network management system 100, the service provider (e.g., MCI Telecommunications Corporation) owns and controls the network elements 110, the OPC 130 and the network manager 140. However, the service provider does not control the content and distribution of the retrieved performance data. Rather, the network element vendors that sell the hardware (i.e. the network elements 110, the OPC 130 and the network manager 140), retain control over both the network management software and the collected data. Specifically, network elements 101–104 are programmed by the vendor to provide only basic predefined information to OPC 130. The retrieved data is then stored in a databases located in the OPCs 130 and the network elements 110. Such databases are also controlled by the vendor. Finally, the vendor generates predefined reports that are provided to the service provider on a network element basis. Effectively, vendors dictate both the type and format of data that is provided to the purchasers of the network elements.

In this situation, a service provider has limited access to its own network data. Customization of the data to be retrieved and the provision of aggregate network-wide reports can be accomplished only through requests to the vendor. This request process is often time consuming, inefficient and expensive. What is needed is a system and method for maximizing (1) the types of data that are extracted from the network elements, and (2) the availability of the extracted data to the service provider for subsequent analysis.

In addition, in the conventional network management system 100, each network element 110 must be configured manually. That is, a network engineer must manually log on the network manager 140 or OPC 130 and send a set of commands to each of the network elements 101–104 that is to be configured. Alternatively, network engineers can configure the network elements 101–104 by locally attaching a terminal to each of the network element's craft interface (not shown, described below), and manually configuring the network elements 101–104. In either case, it should be appreciated that both conventional methods described above involve manually configuring the network elements, one at a time. The conventional method does not provide a network-wide solution. Considering that a typical long distance network comprises many thousands of network elements 101–104, the conventional method of network configuration can be an extremely costly and timely process.

Moreover, using the conventional method, it is very difficult to maintain a consistent configuration for the many thousands of network elements 101–104 comprising the communications network. For example, it is desirable to set consistent alarm thresholds for similar types of network elements throughout the network in order to yield more accurate and uniform performance evaluation results. What is needed therefore, is a system and method for automatically configuring the network elements so that a timely and consistent configuration is assured throughout the network.

SUMMARY OF THE INVENTION

The present invention satisfies the above mentioned monitoring needs by providing a network management system that is controlled by the service provider. Further, the present invention satisfies the above mentioned configuration needs by providing a network management system that automatically configures the network elements. This network management system comprises a plurality of controllers that communicate with a desired network element via a switch 56 network. In a preferred embodiment, the network is divided into one or more data communications channel (DCC) groups that include one or more network elements with craft interface ports directly connected to the switch 56 network.

The network management system first receives a request from a user. The user request can be a monitor request or a configuration request. A monitor request includes information that identifies a network element and the type of information sought to be retrieved from the network element. A configuration request includes information the identifies a network element and the configuration information. Based upon the request, the network management system identifies a DCC group that includes the network element. Next, the network management system identifies one of the network elements in the identified DCC group that has a craft interface port directly connected to the switch 56 network.

After this identification process, the network management system directs a controller to initiate a call to the network element having a direct connection to the switch 56 network. Through this connection, the controller can access any other network element within the DCC group. The data retrieval process and/or configuration process begins after the desired network element is accessed.

Configuration and data retrieval is facilitated by the controller's emulation of a VT100 terminal. After navigating through a series of craft interface menus, the controller sends configuration data to the network element. In case of data collection, the controller extracts the desired data from the screen display data that is received from the network element. The extracted data is stored in a database that can be accessed by any user that is associated with the service provider.

The foregoing and other features and advantages of the invention will be apparent from the following, more particular description of a preferred embodiment of the invention, as illustrated in the accompanying drawings.

BRIEF DESCRIPTION OF THE FIGURES

In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

The present invention addresses the general problem of effectively retrieving and managing network data that is obtained from thousands of network elements under the control of a single service provider. In addition, the present invention address the general problem of effectively configuring the thousands of network elements under the control of a single service provider. As noted above, the conventional network management system 100 is controlled by the vendor. The vendor not only limits the type of data that are retrieved by OPC 130 but also limits the types of reports that are provided to the service provider. With this limited amount of information, the service provider cannot optimally manage the network. Modifications to this vendor-defined process have proven to be expensive, time-consuming and inflexible.

In addition, the conventional network management system only provides for manual configuration of network elements. No system-wide network management solution is provided with the conventional method. With this limited amount of control, the service provider cannot configure the various network elements in an optimal fashion. This has lead to inconsistent configurations and in many cases, improperly configured network elements. Improperly configured network elements can cause network problems to go unnoticed by the service provider. This can lead to more expensive repairs, loss of customer satisfaction and loss of revenue for the service provider.

The present invention is generally designed to increase a service provider's control over the acquisition and analysis of network management data. In the acquisition phase, the present invention increases the types of data that can be retrieved from the network elements. In the analysis phase, the storage of the retrieved data in a service provider controlled database allows the service provider to more effectively analyze and optimize the performance of the network. In addition, the present invention is generally designed to increase a service provider's control over the configuration of the network elements. In the configuration phase, a service provider can configure network elements automatically, on a network-wide basis.

Figure 1:
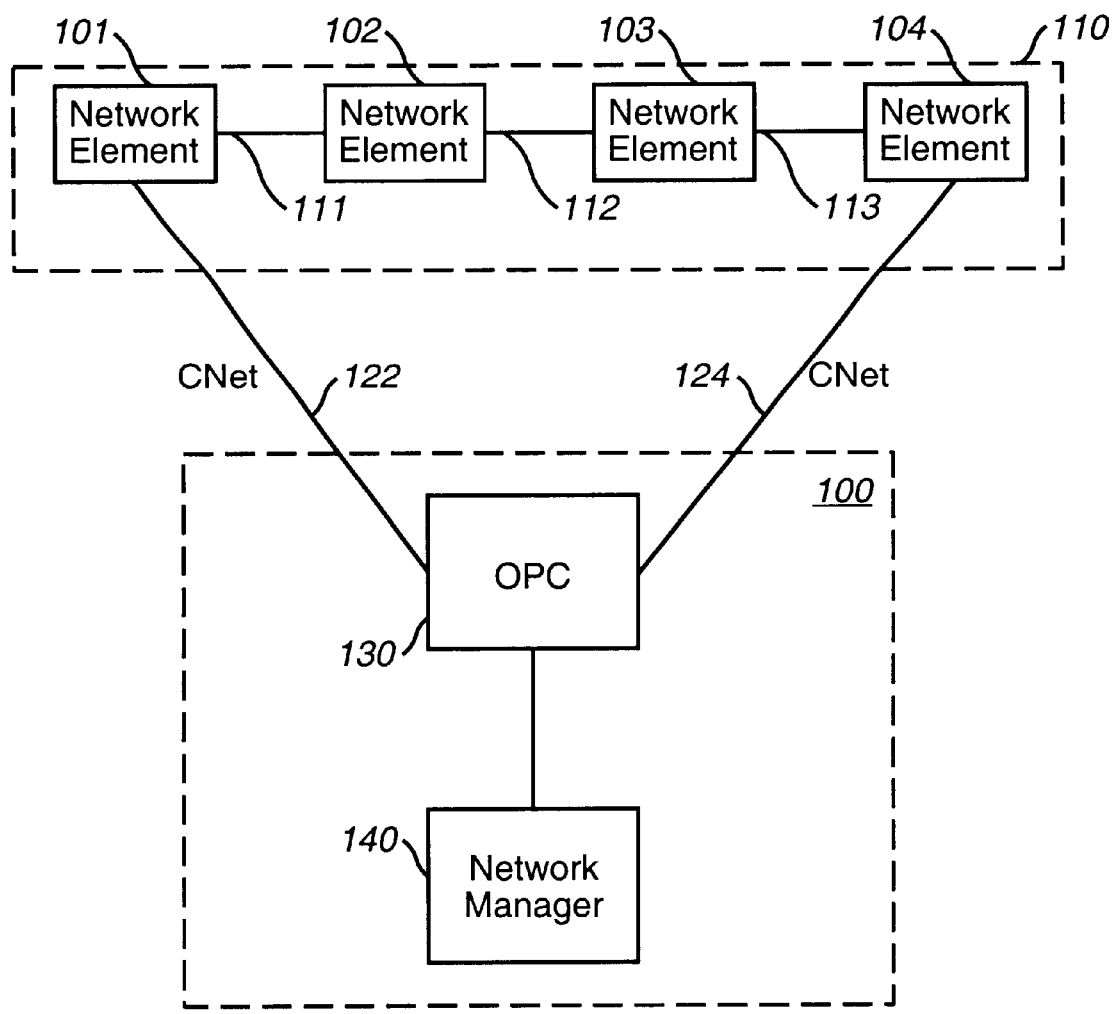
FIG. 1 illustrates a conventional network management system.
Figure 2:
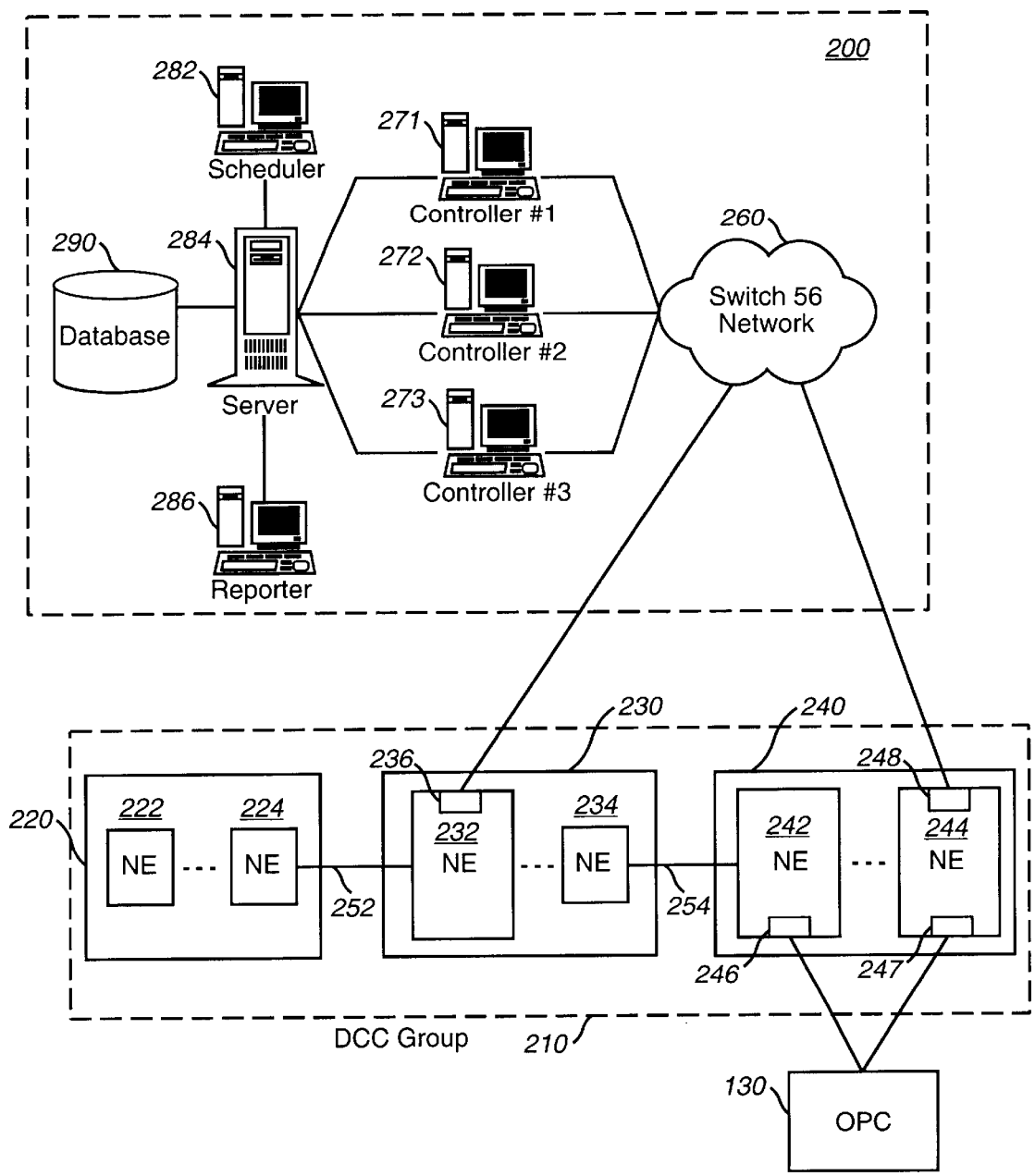
FIGS. 2 and 3 illustrate a network management system according to the present invention.

FIG. 2. illustrates a preferred embodiment of a customer-controlled network management system 200. The network management system 200 includes a communication network, such as switch 56 network 260, that connects any one of controllers 271–273 to any network element in the service provider's network. The switch 56 network 260 is a controlled 56 kbit/s routing network. It should be understood that other types of communication networks could be used in place of a switch 56 network. A controller 271–273 initiates a connection by first dialing the number that is associated with a network element 232, 244 that is directly connected to switch 56 network 260. These directly connected network elements 232, 244 allow access to any network element in data communications channel group (DCC) 210.

In this example, each controller 271–273 has eight ports in which to connect to switch 56 network 260. In combination the controllers 271–273 can make 24 simultaneous calls to the network elements scattered throughout the network. In an alternative embodiment, the controllers 271–273 are connected to the network elements 222, 224 via a private-line network.

The network management system 200 also includes a scheduler 282, a reporter 286, a server 284 and a database 290. The scheduler 282 coordinates user monitor or configuration requests for the controllers 271–273. The reporter 286 generates customized reports that are based on the collected information that is stored in database 290. These customized reports are defined by the service-provider. Finally, the server 284 coordinates the data retrieval and analysis processes that are initiated by user requests.

Figure 3:
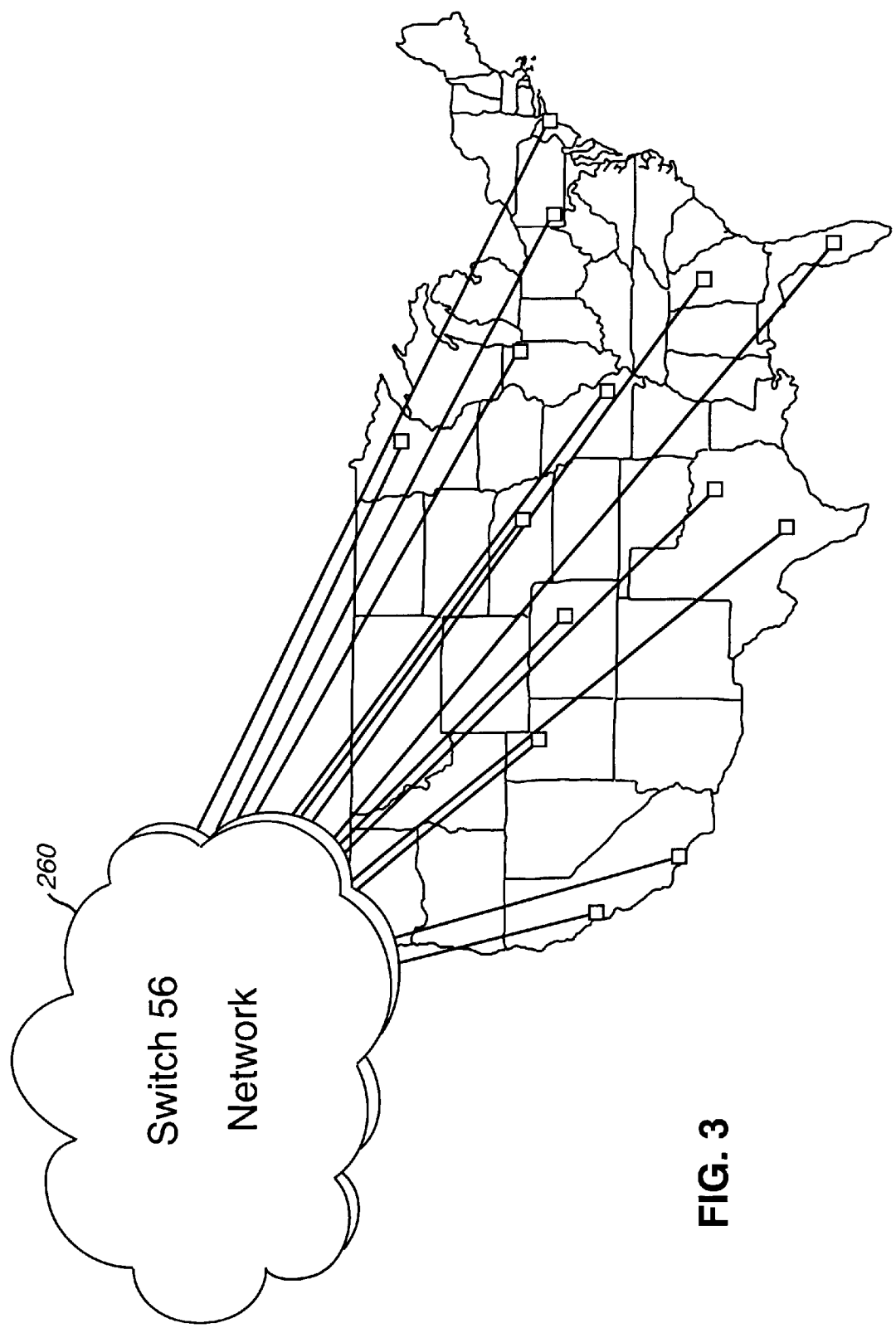

As illustrated in FIG. 3, switch 56 network 260 permits the controllers 271–273 to directly connect to a subset of network elements that are scattered throughout a national network. This subset of network elements provides a connection point between controllers 271–273 and the network elements within the various DCC groups. FIG. 2 illustrates an example of a single DCC group 210. DCC group 210 includes a plurality of OPC groups 220, 230, 240. OPC groups 220, 230, 240 are interconnected by communication links 252, 254. Communication links 252, 254 can represent a communication channel established via the SONET DCC overhead bytes. As defined in the context of network management system 100, each OPC group 220, 230, 240 is associated with a single OPC 130. For convenience, only OPC 130 associated with network element group 240 is shown.

The OPC groups 220, 230, 240 each include a plurality of network elements. The OPC group 220 includes the network elements 222 and 224, the OPC group 230 includes the network elements 232 and 234, and the OPC group 240 includes network elements 242 and 244. With reference to the OPC group 240, the OPC 130 interfaces with the network elements 242 and 244 via the CNet ports 246 and 247, respectively. As noted above, the CNet ports 246 and 247 allow the vendor-controlled OPC 130 to retrieve a basic vendor-defined information set from each of the network elements in OPC group 240. In addition, the CNet ports 246 and 247 allow the vendor controlled OPC 130 to configure each of the network elements in the OPC group 240.

In contrast to the vendor-controlled interface via the CNet ports 246 and 247, network management system 200 interfaces with the network elements in the DCC group 210 via the craft interface ports 226 and 248 on the network elements 232 and 244, respectively. One or more connection points between the switch 56 network 260 and a DCC group can exist. The craft interface ports 236 and 248 represent the connection points between controllers 271–273 and each of the network elements 222, 224, 232, 234, 242, 244 in the DCC group 210. In other words, the connection points at the craft interface ports 236, 248 allow the controllers 271–273 to interrogate the computer that is resident in any network elements in the DCC group 210. This method of interrogation capitalizes on the provision of internal data processing capabilities within each of the network elements. In addition, the connection points at the craft interface ports 236, 248 allow the controllers 271–273 to configure the computer that is resident in any network element in the DCC group 210.

As noted above, communication between the various OPC groups 220, 230, 240 in the DCC group 210 is provided by the links 252, 254. The links 252, 254 can be implemented using the SONET DCC overhead bytes. In the preferred embodiment, a DCC group can include over a hundred network elements. In effect, the various communication links within the DCC group 210 allow the computers within the network elements to operate as a local area network (LAN). To access a particular DCC group, the controllers 271–273 need only dial a number associated with a network element that is directly connected to the switch 56 network 260. Thereafter, the controllers 271–273 are provided with complete access to any of the network elements in the chosen DCC group.

In the network management mode, through the use of the craft interface at network element ports 236 and 248, the controllers 271–273 are allowed to retrieve significantly more information from a network element as compared to OPC 130. For example, in addition to the predefined set of alarm and performance data, the controllers 271–273 can also retrieve said level inventory data (e.g., serial numbers and software versions), tributary layout information, laser bias information, etc. Effectively, all information known to the network element computer is retrievable via craft interface ports 236, 248.

Figure 5:
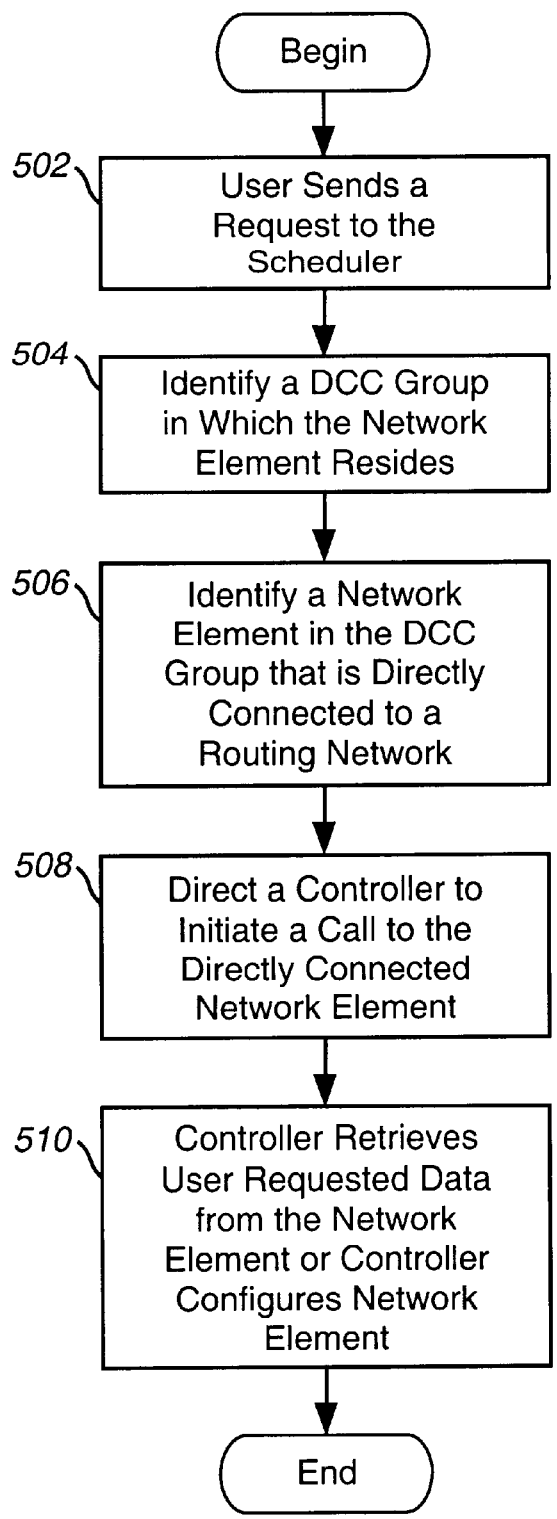
FIG. 5 illustrates a flow chart of the data retrieval process.

Generally, any authorized user associated with the service provider organization can direct one of controllers 271–273 to query a specific network element within the service provider's network. In addition, any authorized user associated with the service provider organization can direct one of controllers 271–273 to configure a specific network element within the service provider's network. FIG. 5 illustrates a flow chart of the user-initiated query or configuration process. First, at step 502, a user sends a request to the scheduler 282 for access to a particular network element. This request includes information that identifies a network element. In addition, for a query operation the user specifies the type of network management data that is sought to be retrieved from the network element. For a configuration operation, the user specifies configuration data for the network element.

In one embodiment, the scheduler 282 uses the received request to automatically generate a series of instructions that allow a controller 271–273 to navigate through a series of menu screens. In an alternative embodiment, the request itself includes script information that directs a controller's navigation through a series of menus screens. The use of menu screens to retrieve network element data and to configure network elements is described in greater detail below.

In one example, a user may spontaneously request information on the operating condition (e.g., laser bias information) of a specific network element. In other examples, a user may schedule a series of periodic requests that seek to gather information from a group of network elements. These periodic requests may seek to gather card-level inventory information, tributary layout information, etc. from all of the network elements in the network for tracking purposes. In either case, the scheduler 282 processes the requests by identifying the connections to be made by controllers 271–273. In yet another example, a user may request to turn-on an optical performance alarm, or may request that new threshold parameters be set to trigger an optical performance alarm.

At step 504, the scheduler 282 identifies the DCC group in which the network element specified by the user resides. Next, at step 506, the scheduler 282 identifies one of the network elements in the DCC group that is directly connected to switch 56 network 260. In the example of FIG. 2, the network elements 232 and 244 of DCC group 210 are directly connected to switch 56 network 260. Each of these directly connected network elements is assigned an identifying number that is used by controllers 271–273 in making a call.

At step 508, the scheduler 282 instructs one of the controller 271–273 to make a call to a directly connected network element. Communication with the directly connected network element allows one of controllers 271–273 to access the information from, or configure any of the network elements in the DCC group. This access is provided by the LAN-like configuration that is created by the communication links that interconnect the network elements in the DCC group. Once communication has been established with the network element, the controller 271–273 can then retrieve any data that may be requested by the user, or the controller 271–273 may configure any of the network elements within the DCC group 210. This process is represented by step 510.

The retrieval and/or configuration process at step 510 is facilitated by the emulation by controllers 271–273 of a VT100 terminal (or other type of computer terminal) typically used in a craft interface connection. Through this emulation process, a controller 271–273 automatically navigates through a series of menu screens to identify the menu option that will produce the data requested or produce the configuration results requested by the user.

It should be appreciated that the method described above, with reference to FIG. 5, can be used to monitor and configure network elements on networkwide basis. For example, the scheduler 282 can be programmed to perform periodic jobs that direct the controllers 271–273 to visit each network element within the telecommunications network, in a manner as described above. In this fashion the performance of the entire telecommunications network can be monitored in a periodic and consistent fashion. For example, nightly collection jobs can be scheduled so that network-wide performance data is available to the service provider on a daily basis.

In a similar fashion, the scheduler 282 can be programmed to perform periodic configurations on a network-wide basis. For example, it may be desired to periodically turn-on performance alarms. Alarms that are switched off, for one reason or another, will cause performance problems to go unnoticed. Alarms that have been inadvertently switched-off have proven to be troublesome for the telecommunications industry. In many cases, alarms are never turned on in newly deployed network elements. Thus, the present invention can be used to systematically turn on all desired alarms within the entire telecommunications network. This process can be repeated on a periodic basis, to assure that alarms are turned on for newly deployed network elements and for any other network elements in which alarms are inadvertently switched-off.

Additionally, the present invention can be used to set alarm threshold parameters for network elements on a network-wide basis. This will assure that consistent parameters are used throughout the network in order to increase the accuracy and reliability of the performance reports and alarms on a network-wide basis. Once again, this process can be repeated on a periodic basis to assure that consistent values for all network elements within the network. In addition, this process can be repeated whenever it is desired to change the values of the alarm threshold parameters. This aspect of the present invention facilitates experimentation with the alarm threshold parameter values, so that optimal values can be determined.

Figure 4:
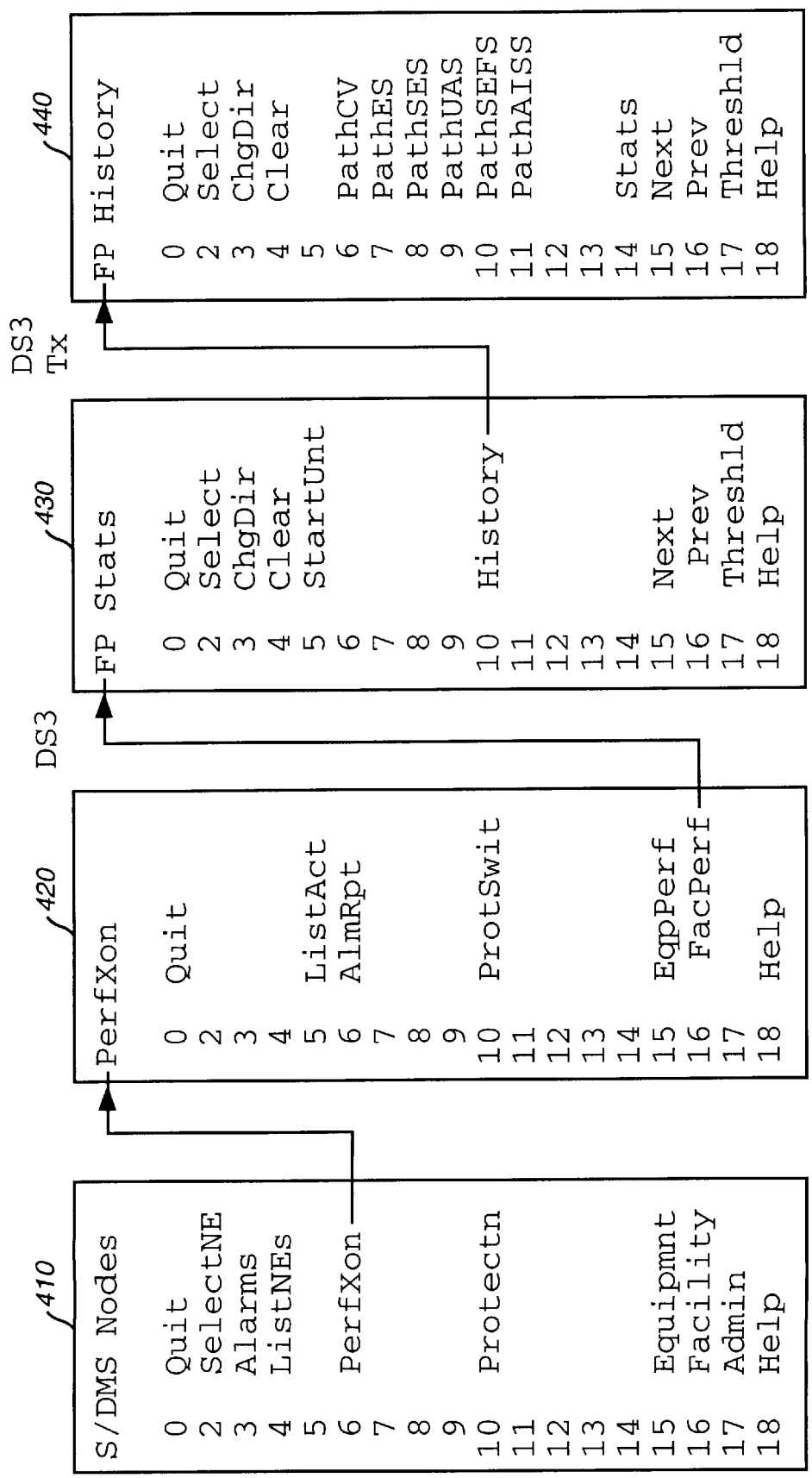
FIG. 4 illustrates an example of a series of menus that are navigated through the craft interface of a network element.

An example of a sequence of menu screens 410, 420, 430, 440 used in the communication between controllers 271–273 and the network elements is illustrated in FIG. 4. In this example, a data request is being processed through a series of pre-defined menu screens 410–440. The menu screens 410–440 are typically defined by the vendor. Starting at menu screen 410, a controller 271–273 automatically selects the type of information to be extracted. In this example the options include alarm information (3), performance monitoring information (6), protection information (10), facility information (16), etc.

In the example of FIG. 4, a controller 271–273 automatically chooses in sequence, the choice of the performance monitoring option (6) in menu screen 410, the facility performance option (16) in the menu screen 420, and the history option (10) in the menu screen 430. At menu screen 440, the controller 271–273 is presented with various performance monitoring parameters that can be retrieved. For example, controller 271–273 can select the historical data for path-level errored seconds (PathES) or path-level severely errored seconds (PathSES). After the controller 271–273 selects a specific parameter identified by the user request, the computer in the network element being queried returns a result to be displayed on the emulated VT100 screen. Thus, the controller 271–273 selects the appropriate menu items to perform the intended function. If a configuration request is desired, such as a request to turn on a performance alarm, another set of menu screens (not shown) would be traversed, in a similar fashion as described above.

The results to be retrieved is obtained by a "screen-scraping" method. In this process, the controller 271–273 receives data to be displayed on a VT100 screen. This display data is in a data format that includes row position information, column position information, and ASCII encoded text to be displayed at the specified row and column positions. Since a controller 271–273 knows the position at which the returned result is to be displayed, the controller 271–273 can extract the ASCII encoded information that is associated with the known row and column position identifiers. Thereafter, the ASCII coded information is converted and stored in database 290.

Note that during the processing of requests, information is typically retrieved by the controllers 271–273 via the "screen-scraping" method as described above. For example, during the processing of a configuration request to set alarm parameters, several menu screens, such as the menu screen 410, are typically traversed by the controllers 271–273. Each new menu screen is typically analyzed via the "screen-scraping" method to verify the progress of the operation. Thus, as the term is used herein, retrieving information from the network elements, not only refers to retrieving result data, such as status information associated with a monitor request, but it also refers to retrieving menu screen data associated with the processing of any type to request.

The database 290 contains stored network element data extracted by the controllers 271–273 in response to user requests that are generated by any user associated or authorized by the service provider. As noted above, most of this network element data is not available through conventional network management system 100. As a further benefit, information stored in the database 290 can be extracted and analyzed by any user or group associated with the service provider. Additionally, any user or group associated with the service provider can remotely configure any or all of the network elements throughout the entire network.

Thus, while the network management system 100 typically provides performance data reports for specific network elements, the network management system 200 allows the generation of reports and configuration on a network-wide basis. For example, trend statistics can be generated across multiple network elements. These trend statistics allow network management to be performed properly at a higher network level rather than at the network element level.

Figure 6:
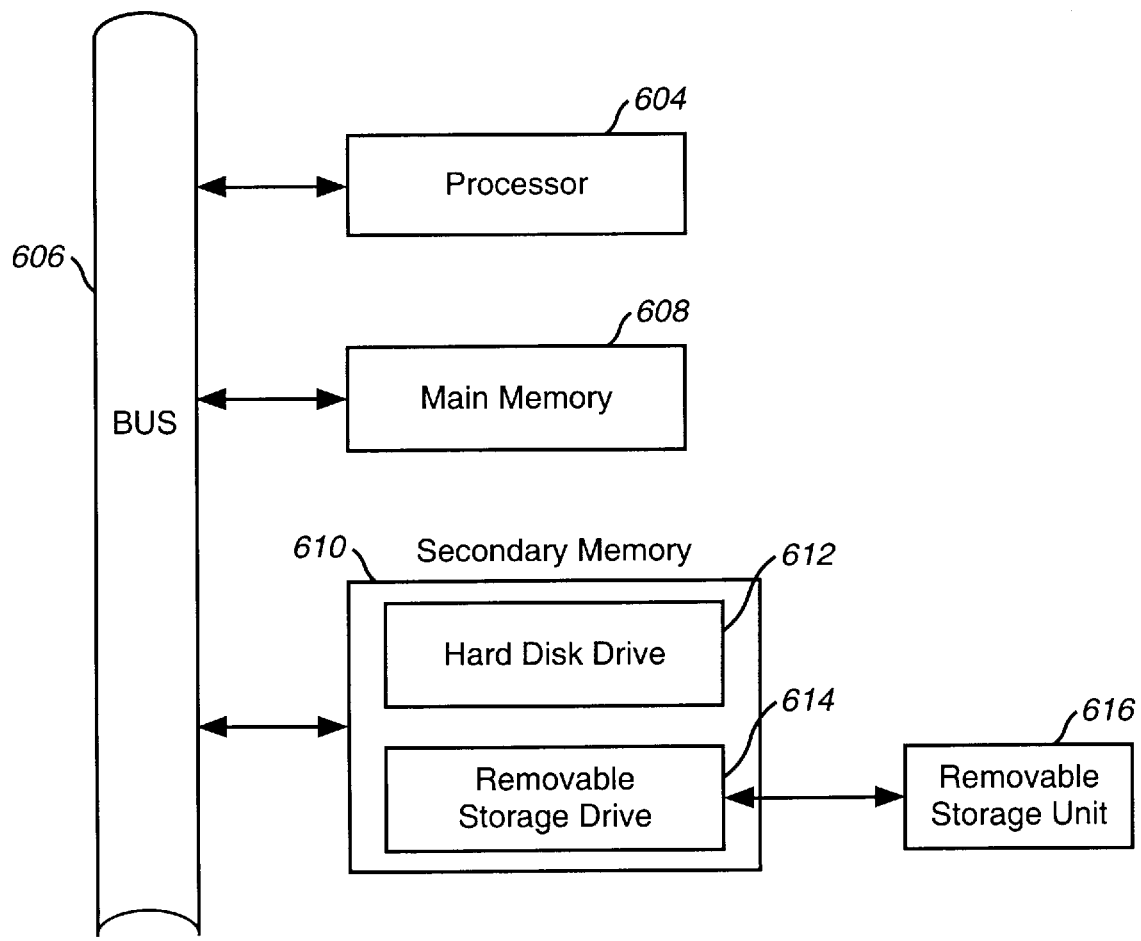
FIG. 6 illustrates a block diagram of a computer useful for implementing elements of the present invention.

In one embodiment, elements of the invention are implemented in one or more computer systems operating as discussed herein. For example, controllers 271–273, scheduler 282, server 284, reporter 286 and elements in DCC group 210 are implemented using computer systems. An exemplary computer system 602 is shown in FIG. 6. The computer system 602 includes ore or more processors, such as processor 604. The processor 604 is connected to a communication bus 606.

The computer system 602 also includes a main memory 608, preferably random access memory (RAM), and a secondary memory 610. The secondary memory 610 includes, for example, a hard disk drive 612 and/or a removable storage drive 614, representing a floppy disk drive, a magnetic tape drive, a compact disk drive, etc. The removable storage drive 614 reads from and/or writes to a removable storage unit 616 in a well known manner.

Removable storage unit 616, also called a program storage device or a computer program product, represents a floppy disk, magnetic tape, compact disk, etc. As will be appreciated, the removable storage unit 616 includes a computer usable storage medium having stored therein computer software and/or data.

Computer programs (also called computer control logic) are stored in main memory and/or the secondary memory 610. Such computer programs, when executed, enable the computer system 602 to perform the features of the present invention as discussed herein. In particular, the computer programs, when executed, enable the processor 604 to perform the features of the present invention. Accordingly, such computer programs represent controllers of the computer system 602.

In another embodiment, the invention is directed to a computer program product comprising a computer readable medium having control logic (computer software) stored therein. The control logic, when executed by the processor 604, causes the processor 604 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art(s).

While the invention has been particularly shown and described with reference to preferred embodiments thereof, it will be understood by those skilled in the relevant art that various changes in form and details may be made therein without departing from the spirit and scope of the invention.

What is claimed is:

1. A system for automatically configuring network elements, the system comprising:

means for receiving a request from a user to configure a first network element in a network arranged as a plurality of data communication channel groups, each data communications channel group including a plurality of network elements that are interconnected by a plurality of data communication channel links;

means for identifying a data communication channel group that includes said first network element;

means for identifying a second network element in said data communication channel group that is directly connected, via a craft interface port on said second network element, to a routing network; and means for directing a controller to initiate a call to said second network element, wherein said controller sends data from said user from said first network element via data communication channel links between said second network element and said first network element.

2. The system of claim 1, wherein said request is for setting the on-off status of a network element performance alarm.

3. The system of claim 1, wherein said request is for setting the threshold parameters for a network element performance alarm.

4. The system of claim 1, further comprising a means for automatically generating a series of instructions that allows said configuration means to navigate through a series of menu screens.

5. The system of claim 1, wherein said request includes script information that directs said configuration means to navigate through a series of menu screens.

6. The system of claim 1, further comprising a means for scheduling a periodic series of requests for configuring the network elements in the network.

7. The system of claim 6, wherein said periodic series of requests include requests for setting the on-off status for performance alarms.

8. The system of claim 1, further comprising:

means for emulating a computer terminal; and means for retrieving data from a network element via a screen scraping method performed on data received by said computer terminal.

9. A method for configuring network elements, the method comprising the steps of:

(1) receiving a request from a user to configure a first network element in a network arranged as a plurality of data communication channel groups, each data communications channel group including a plurality of network elements that are interconnected by a plurality of data communication channel links;

(2) identifying a data communication channel group that includes said first network element;

(3) identifying a second network element in said data communication channel group that is directly connected, via a craft interface port on said second network element, to a routing network; and (4) directing a controller to initiate a call to said second network element, wherein said controller retrieves data requested by said user from said first network element via data communication channel links between said second network element and said first network element.

10. The method of claim 9, wherein said step (1) comprises the step of receiving a request from a user to set the on-off status of a network element performance alarm.

11. The method of claim 9, wherein said step (1) comprises the step of receiving a request from a user to set network element alarm threshold parameters.

12. The method of claim 9, further comprising the step of:

(5) generating a series of instructions that allows said controller to navigate through a series of menu screens.

13. The method of claim 9, wherein said step (1) comprises the step of receiving a request from a user that includes script information that directs said controller to navigate through a series of menu screens.

14. The method of claim 9, further comprising the step of:

(5) scheduling a periodic series of requests to set on-off performance alarm status for network elements in the network.

15. The method of claim 9, further comprising the step of (5) scheduling a periodic series of requests to set alarm threshold parameters for network elements in the network.

16. The method of claim 9, further comprising the steps of:

(5) emulating a computer terminal; and (6) retrieving data from a network element via a screen scraping method performed on data received by said computer terminal.

17. A computer program product, comprising:

a computer usable medium having computer readable program code means embodied in said medium for enabling a processor to manage program execution, said computer readable program code means comprising:

computer readable program code means for causing a computer to receive a request from a user to configure a first network element in a network arranged as a plurality of data communication channel groups, each data communications channel group including a plurality of network elements that are interconnected by a plurality of data communication channel links;

computer readable program code means for causing a computer to effect an identification of a data communication channel group that includes said first network element;

computer readable program code means for causing a computer to effect an identification of a second network element in said data communication channel group that is directly connected, via a craft interface port on said second network element, to a routing network; and computer readable program code means for causing a computer to direct a controller to initiate a call to said second network element, wherein said controller retrieves data requested by said user from said first network element via data communication channel links between said second network element and said first network element.

* * * * *